2,802,876

PROCESS FOR PRODUCTION OF SATURATED KETONES

Franz Broich and Karl Mönkemeyer, Marl, Kreis Recklinghausen, Germany, assignors to Chemische Werke Huls Aktiengesellschaft, Marl, Kreis Recklinghausen, Germany, a corporation of Germany No Drawing. Application March 26, 1954,
Serial No. 419,085

Claims priority, application Germany May 22, 1953

3 Claims. (Cl. 260—593)

It is known that ketols can be transformed by splitting out water into unsaturated ketones, which in turn can be transformed by hydrogenation in the presence of catalysts into saturated ketones. Both methods can be carried out with good yields and offer no particular difficulties.

It has been found that valuable saturated ketones, which are of great interest as solvents and as starting materials for a number of other chemical products, can be produced in a single reaction step from the corresponding ketols, if the ketols, especially those with a tertiary hydroxyl group, are treated with hydrogen in the presence of conventional hydrogenation catalysts and in the presence of a free acid which is not destroyed by the hydrogenation at elevated temperature. The process can be carried out at atmospheric pressure but superatmospheric pressure is preferable. The hydroxyl group is either removed as water and the resulting unsaturated ketone is at the same time hydrogenated or the hydroxyl group is substituted directly by a hydrogen atom.

Conventional hydrogenation catalysts contain as already known metals of the first or eighth sub group of the periodic system which may be activated by chromium, alkali metals, magnesium, boron or alumina and deposited on a carrier.

Suitable carriers for the catalyst are pumice, silica-gel, kieselguhr, char-coal, coke, chamotte and porcelain.

Non-volatile inorganic acids derived from phosphorus or boron such as phosphoric acid, boric acid, borylphosphate, phosphomolybdic acid, phosphotungstic acid, borotungstic acid etc. are preferably used, but volatile organic acids especially fatty acids as formic acid, acetic acid, propionic acid, and aromatic carboxylic acids as benzoic acid, phenyl acetic acid, phthalic acid are also suitable in the process.

The process may be carried out by suspending a carrier-free hydrogenation catalyst in the ketol, in which at least 5 percent by weight of an organic acid are dissolved, with subsequent hydrogenation. By using a mixture of a hydrogenation catalyst with at least 5 percent by weight of non-volatile inorganic acid, with or without a carrier, similar results will be obtained. Finally hydrogenation catalysts may be used, which are prepared by impregnating a carrier with a non-volatile inorganic acid with subsequent precipitation of the hydrogenation catalyst on the carrier or by intimately mixing a carrier containing a non-volatile inorganic acid with a hydrogenation catalyst.

The hydrogen can be added at any desired pressure, preferably at high pressure from about 100–300 atm. abs. The process can be carried out intermittently or, preferably, continuously in a pressure tube. The hydrogen can be conducted in direct flow or in counter flow and in larger plants it can be circulated.

The temperature is maintained between 150° and 300° C. and depends in each instance on the type of the ketol used. All ketols can be used as starting material which can be obtained from aldehyde and ketone or from ketone and ketone by ketolization. With particular advantage can be used those ketols which have tertiary hydroxyl groups, such as for example pentanolone-2,4, 3- methyl-pentanolone - 2,4, heptanolone - 2,4, benzoylisopropanol, (1-oxypropyl)-cyclohexanone, undecanolone-2,4, diacetone-alcohol (equals 2-methyl-pentanolone-2,4) etc.

Example 1

857 parts by weight of diacetone alcohol were treated with hydrogen in the presence of 17 parts by weight of acetic acid and 18 parts by weight of carrier-free Cu-catalyst activated by 5 percent by weight of Cr at 200° C. and 270 atm. abs. pressure for four hours in a 1-liter shaking autoclave. The reaction product contained 36.5% acetone, 20.7% isopropanol, 19.2% hexone, 4% methyl pentanol, 10% higher boiling materials, the balance being water.

Example 2

857 parts by weight of diacetone alcohol, 430 parts by weight of water, 18 parts by weight of carrier-free Cu-catalyst activated by 5 percent by weight of Cr and 17 parts by weight of acetic acid were mixed and treated with hydrogen at 200° C. and 270 atm. abs. for four hours. The reaction product contained 45% cleavage products and water, in addition to 48% hexone.

Example 3

In a high pressure tube which was filled with a catalyst containing 17.3% Cu, 16.6% $H_3PO_4$, 0.41% Cr and 65.69% of a carrier of silica gel, a flow of diacetone alcohol at the rate of 0.2 l. per liter of catalyst per hour were treated with hydrogen at 200° C. and at 300 atm. abs. The reaction product contained 13.9% water, 10.4% acetone, 7.4% isopropanol, 60.6% hexone (that is about 70% of the theory) and 6.6% mesityl oxide.

Example 4

A catalyst consisting of 27.9% boric acid, 31.0% phosphoric acid, 4.02% Cu, 1.0% Ni and 0.17% Cr, the balance is kieselguhr, obtained by intimately mixing borylphosphate and a Cu-Ni-hydrogenation catalyst, activated with chromium, was charged in a high pressure tube.

Per 100 cm.$^3$ of the catalyst a flow of 30 cm.$^3$/h. diacetone alcohol was treated at 200° C. with 200 l./h. hydrogen at 300 atm. abs. The reaction product contained 10% acetone, 2% isopropanol, 3% methyl pentanone and 67% hexone (corresponding 78% of the theory), the balance being water and some higher boiling materials.

Example 5

A high pressure tube was charged with a mixture in the proportion 1:1 of coke, containing 3.18% phosphoric acid, 3.08% $Na_2H_2P_2O_7$, 26.25% trimetaphosphate and 5.01% Madrell salt, and a hydrogenation catalyst, containing 9% Cu, 2.5% Ni and 0.2% Cr, the balance is kieselguhr.

Per 100 cm.$^3$ of the mixture a flow of 40 cm.$^3$/h. diacetone alcohol was treated at 190° C. with 200 l./h. hydrogen of 300 atm. abs. The reaction product contained 75% hexone (corresponding 89% the theory), 15% water and 10% higher boiling materials.

We claim:
1. Process for the production of methyl-iso-butyl-ketone, which comprises hydrogenating diacetone-alcohol in the presence of a hydrogenation catalyst and a free acid which is not destroyed by the hydrogenation at a temperature of from 150° C. to 300° C.

2. Process as defined in claim 1 in which the hydrogenation is carried out at a pressure of from about 100 to 300 atmospheres absolute.

3. Process as defined in claim 1 in which the free acid is a non-volatile acid of the group consisting of phosphoric acid, boric acid, phosphomolybdic acid, phosphotungstic acid and borotungstic acid.

References Cited in the file of this patent

UNITED STATES PATENTS

| 2,139,360 | Fairbairn et al. | Dec. 6, 1938 |
| 2,499,172 | Smith | Feb. 28, 1950 |